(12) United States Patent
Lahr

(10) Patent No.: US 10,054,205 B2
(45) Date of Patent: Aug. 21, 2018

(54) TORQUE INLINE HYDRAULIC PUMP FOR CVTS

(71) Applicant: GM Global Technology Operations LLC, Detroit, MI (US)

(72) Inventor: Derek F. Lahr, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 326 days.

(21) Appl. No.: 15/070,492

(22) Filed: Mar. 15, 2016

(65) Prior Publication Data

US 2017/0268645 A1 Sep. 21, 2017

(51) Int. Cl.
| | |
|---|---|
| *F16H 37/08* | (2006.01) |
| *F16H 37/02* | (2006.01) |
| *F16H 61/00* | (2006.01) |
| *F16H 61/662* | (2006.01) |

(52) U.S. Cl.
CPC ....... *F16H 37/0813* (2013.01); *F16H 37/022* (2013.01); *F16H 61/0031* (2013.01); *F16H 2037/023* (2013.01); *F16H 2061/66286* (2013.01)

(58) Field of Classification Search
CPC .............. F16H 37/0813; F16H 37/022; F16H 61/0031; F16H 2037/023; F16H 2037/66286
See application file for complete search history.

(56) References Cited

U.S. PATENT DOCUMENTS

| | | | | |
|---|---|---|---|---|
| 2006/0276291 A1* | 12/2006 | Fabry | ..................... | F16H 47/04 475/72 |
| 2007/0232423 A1* | 10/2007 | Katou | ............... | F16H 61/66272 474/28 |
| 2010/0203989 A1* | 8/2010 | Shirasaka | ........... | F16H 61/0031 474/28 |
| 2016/0009273 A1* | 1/2016 | Nagamine | ........... | F16H 61/0031 180/65.25 |
| 2017/0328453 A1* | 11/2017 | McKinzie | ............... | F16H 3/727 |

* cited by examiner

*Primary Examiner* — Jacob S. Scott
*Assistant Examiner* — Tinh Dang
(74) *Attorney, Agent, or Firm* — Lorenz & Kopf, LLP

(57) ABSTRACT

A product may include a power source, and a pump may be driven by the power source. A variable load may be driven by the power source and may be supplied with a fluid from the pump. A torque splitting device may have an input from the power source and may provide an output to each of the pump and the variable load.

17 Claims, 3 Drawing Sheets

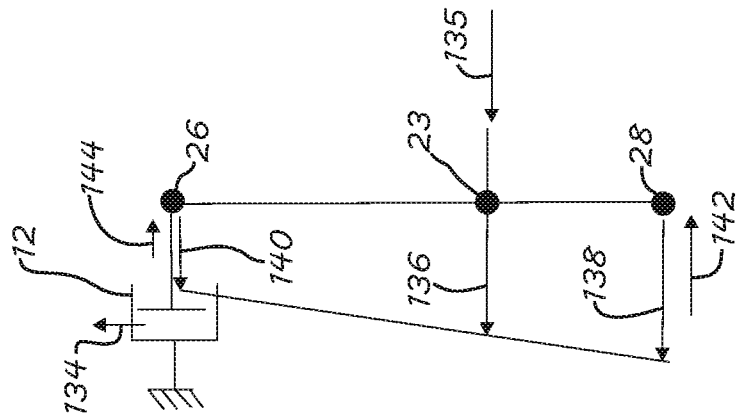
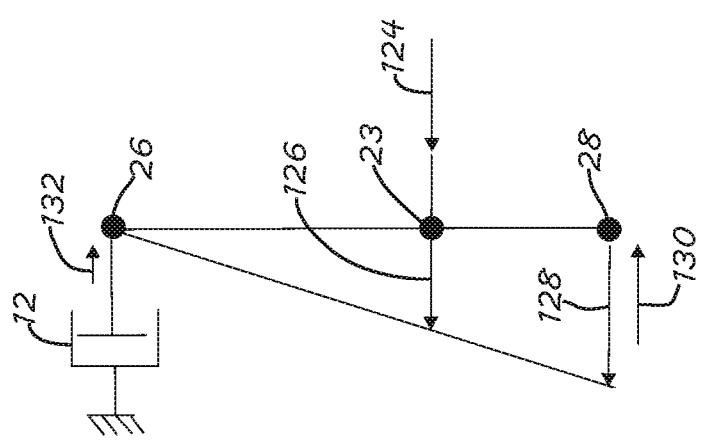

TORQUE INLINE HYDRAULIC PUMP FOR CVTS

TECHNICAL FIELD

The field to which the disclosure generally relates includes fluid pressure operated devices, and in particular includes fluid pressure operating systems in continuously variable transmissions (CVTs).

BACKGROUND

The source for a supply of pressurized fluid for use in controlling or operating devices may typically be a pump. The pump may provide fluid flow within the operating pressure range of the system within which it may be employed.

SUMMARY OF ILLUSTRATIVE VARIATIONS

A number of illustrative variations may involve a product that may include a power source, and a pump may be driven by the power source. A variable load may be driven by the power source and may be supplied with a fluid from the pump. A torque splitting device may have an input from the power source and may provide an output to each of the pump and the variable load.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 2 is a diagram representing part of a product according to a number of variations.

FIG. 3 is a diagram representing part of a product in a no-flow condition according to a number of variations.

FIG. 4 is a diagram representing part of a product in a full-flow condition according to a number of variations.

DETAILED DESCRIPTION OF ILLUSTRATIVE VARIATIONS

The following description of the variations is merely illustrative in nature and is in no way intended to limit the scope of the invention, its application, or uses.

Figure 1:
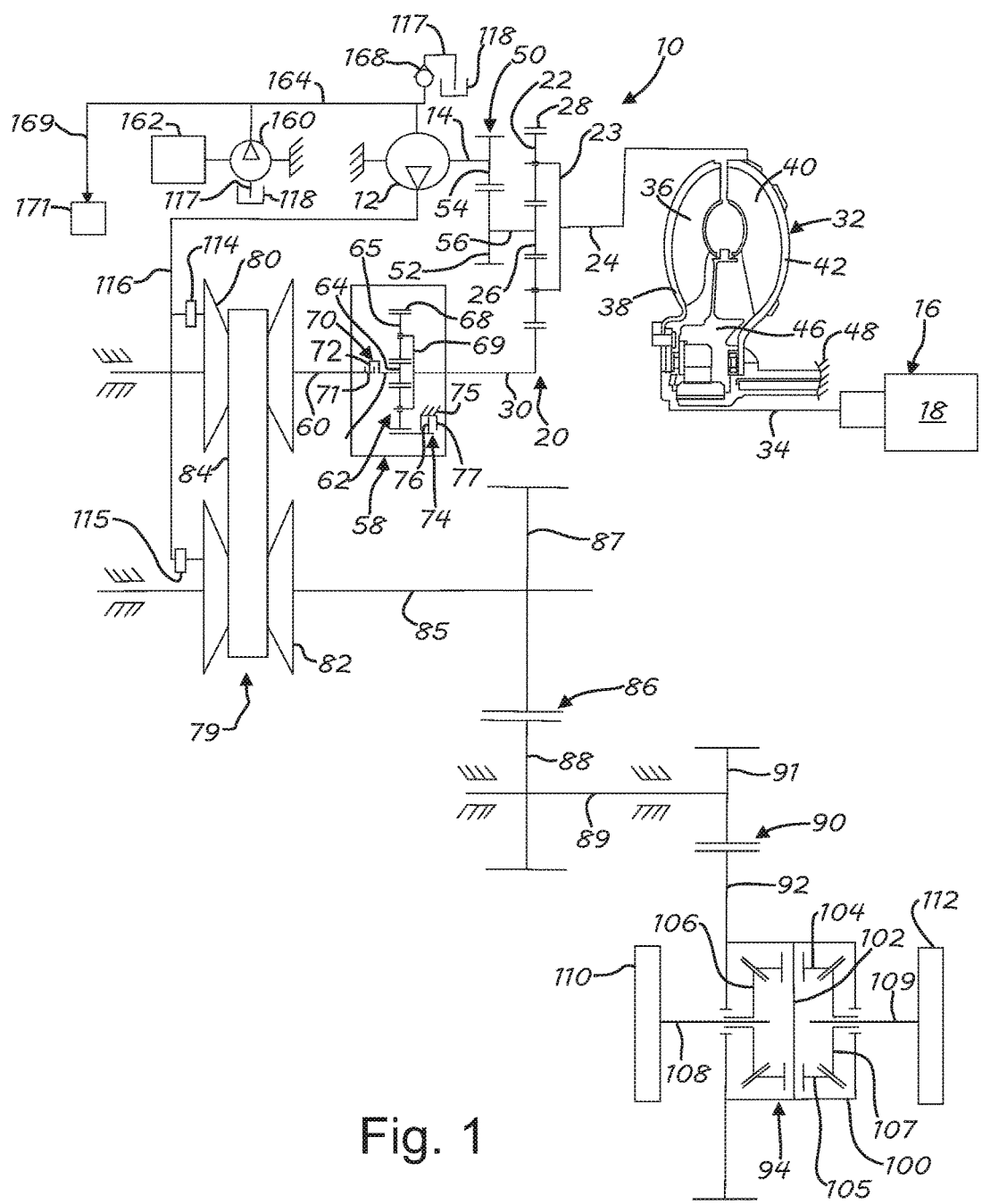
FIG. 1 is a schematic illustration of a product according to a number of variations.

In a number of variations as illustrated in FIG. 1, a product 10 may include a pump 12 for a supply fluid flow and/or pressure. A shaft 14 may provide power input to the pump 12 from a power source 16. The power source 16 may be a vehicle power plant or another source and may include an internal combustion engine 18, or may be another power plant that may operate through a range of rotational speeds. The pump may be of a conventional type such as a gear, gerotor, vane, or other fluid pump type as an energy source for the fluid of the product 10. When a pump's operating speed is reduced, less energy may be imparted to the fluid. Accordingly, in a conventional product, pumps that operate in a system with varying speed input may be increased in size and/or capacity to supply sufficient flow at lower input speeds. In such a system, operation of the pump at higher input speeds may result in conditions where excess energy needs to be throttled or bypassed. Losses associated with pumping unneeded fluid at higher speeds may result in inefficiencies. A number of variations as described herein may advantageously avoid such losses.

In a number of variations the input shaft 14 may be connected with the power source 16 through a power splitting device 20. The power splitting device 20 may be a gear set such as a planetary gear set. The power splitting device may include a number of planet gears 22 that may be carried by a carrier 23. The carrier 23 may be connected with the power source 16 by a torque transfer element 24 that may be a shaft or another torque transfer element such as a tube, cup or other structure. In a number of variations the torque transfer element 24 may be a part of the carrier 23. The planet gears 22 may be engaged with a sun gear 26 through contact via a number of positively meshing gear teeth on each element. Output from the power splitting device 20 may be supplied to the pump 12 from the sun gear 26. The planet gears 22 may be engaged with a ring gear 28 through contact via a number of positively meshing gear teeth on each element. A second output from the power splitting device 20 may be supplied to a torque transfer element 30 from the ring gear 28, which may be formed with the ring gear 28 or engaged therewith.

In a number of variations the torque transfer element 24 may be connected with the power source 16 through a coupling 32. When the power source includes the internal combustion engine 18, the coupling 32 may be a torque converter type fluid coupling. An output shaft 34 may supply power from the power source 16. The output shaft 34 may be connected with an impeller 36 through a first housing section 38 of the coupling 32. The torque transfer element 24 may be connected with a turbine 40 through a second housing section 42. The housing sections 38, 42 may form a housing that may contain a fluid through which the coupling 32 may transfer torque. A stator 46 may be positioned between the impeller 36 and the turbine 40 and may effect an increase in output torque through the coupling 14 from the output shaft 34 to the torque transfer element 24. The stator 46 may be grounded at a case 48. Rotation of the impeller 36 may move fluid to rotate the turbine 40 so that the torque transfer element 24 is driven by the output shaft 34. The coupling 32 may allow the impeller 36 to rotate relative to the turbine 40 and a lockup clutch may be provided to lock the housing sections 38, 42 to rotate together.

In a number of variations the input shaft 14 of the pump 12 may be connected with the sun gear 26 through a gear set 50. The gear set 50 may include a gear 52 fixed to rotate with the sun gear 26 and connected therewith by a torque transfer element 56. The gear set 50 may include a gear 54 connected with the pump 12 through the input shaft 14. The gears 52 and 54 may have a number of teeth that positively mesh together. The gear 52 may have a greater number of teeth and a larger outermost diameter so that the gear 54 may rotate at a greater speed than the gear 52. In a number of variations the input shaft 14 may be connected to a different element of the gear set 50 and/or the torque transfer element 56 may be connected with a different element of the gear set 20 to provide desirable torque.

In a number of variations the torque transfer element 30 may be connected with a multi-mode unit 58, which may effect a number of operational modes which may include neutral, forward and reverse operation. A shaft 60 may be selectively driven by the torque transfer element 30 through the multi-mode unit 58. More specifically, the torque transfer element 30 may be disengaged from the shaft 60 to effect a neutral mode. The torque transfer element 30 may be engaged with the shaft 60 through the multi-mode unit 58 to effect a forward drive mode. The torque transfer element 30 may be engaged with the shaft 60 through the multi-mode unit 58 to effect a reverse drive mode where the shaft 60 may be driven to rotate in a reverse direction as compared to the direction it rotates in the forward drive mode.

In a number of variations the multi-mode unit 58 may include a planetary gear set 62 with a sun gear 64, a number of planet gears 65 and a ring gear 68. Input may be provided from the torque transfer element 30, which may be connected to the carrier 69 which carries the planet gears 65. Output may be provided from the sun gear 64 which may be connected with the shaft 60 through an engagement mechanism 70. The engagement mechanism 70 may be a friction plate type wet clutch which may include a number of inner plates 71 fixed to rotate with one of the torque transfer element 30 (which may be connected through the gear set 62), or the shaft 60, and a number of interlayered outer plates 72 fixed to rotate with the other one of the torque transfer element 30 or the shaft 60. An actuator (not shown), may selectively effect compression of the inner and outer plates 71, 72 so that they rotate together to drive the shaft 60 to provide the forward drive mode. A second engagement mechanism 74 may be a friction plate type wet clutch which may include a number of plates 76 fixed to rotate with the ring gear 68, and a number of interlayered plates 77 fixed to the case 75. An actuator (not shown), may selectively effect compression of the plates 76, 77 so that the ring gear becomes grounded to the case 75 to reverse rotation of the sun gear 64 providing the reverse drive mode.

In a number of variations the shaft 60 may be connected with a variator unit 79, at a primary pulley cone set 80. The primary pulley cone set 80 may be connected with a secondary pulley cone set 82 by a linking member 84 which may be a belt or chain. The secondary pulley cone set 82 may rotate on a shaft 85 that may be connected with a gear set 86 at a gear 87. The gear 87 may rotate on a shaft 89 that may be connected to another gear set 90 at a gear 91. The gear 91 may positively mesh with a gear 92 that may be connected with a differential unit 94.

In a number of variations the differential unit 94 may include a cage 100 and may have a pinion shaft 102 that may be engaged at each of its ends with the cage 100. The cage 100 may be rotatable and may be connected with the gear 92. The pinion shaft 102 may carry a pinion gear 104 and a pinion gear 105, each of which may be rotatable on the pinion shaft 102. A side gear 106 may mesh with each of the pinion gears 104, 105 and another side gear 107 may mesh with each of the pinion gears 104, 105. The side gear 106 may be connected with an axle shaft 108 and the side gear 107 may be connected with an axle shaft 109. The axle shafts 108, 109 may be connected with road wheels 110, 112 respectively, that may engage a roadway for propulsion purposes and may be driven by the power source 16.

In a number of variations the opposing cones of each of the pulley cone sets 80, 82 of the variator unit 79 may be moved toward or away from one another to change the effective drive ratio between the primary pulley cone set 80 and the secondary pulley cone set 82. Actuators 114 and 115 may be provided in the variator unit 79 to effect movement of the primary pulley cone set 80 and the secondary pulley cone set 82 in response to fluid pressure supplied by the pump 12 through a fluid conduit set 116. The actuators 114, 115 may be of a hydraulic piston type and may be in the variator unit 79, which may be a variable load served by the pump 12 and the power source 16. An electronic controller (not shown), may control the operation of the actuators 114, 115 in a preprogrammed manner in response to operating conditions to vary the clamping force applied by fluid pressure from the pump 12 through the conduit set 116 to the cone sets 80, 82. The pump 12 may draw fluid from a reservoir 118. As driven by the power source 16 through the torque splitting device 20, the pump 12 may be torque driven and the torque applied to the pump 12 is proportional to the output torque from the power source 16. This is opposed to a pump with velocity proportional to the velocity of the power source. With the torque splitting device 20 splitting torque between the torque transfer elements 56 and 30, velocity of the pump 12 is not directly linked to velocity of the power source 16, and thus it will pump an amount of fluid as required by the system, rather than over pumping at higher speeds. The torque of the sun gear 26 may be represented by the equation: output torque at sun gear 26=input torque at carrier 23×(number of teeth of sun gear 26 teeth)/(number teeth of ring gear 28+number of teeth of sun gear 26). With the pump 12 and power source 16 connected as described above, it follows that the pump torque will be proportional to engine torque. With output from the ring gear 28 supplied to the variator unit 79, since the ring gear 28 is larger (has a greater number of teeth), than the sun gear 26, it also follows that a larger proportion of the torque is supplied for propulsion purposes through the variator unit 79. The speed of the pump 12 and the flow rate leaving the pump 12 are determined by the downstream requirements of the cone sets 80 and 82.

In a number of variations the torque splitting device 20 may be represented by a lever diagram as shown in FIG. 2. The lever 120 may include points representing the carrier 23, the sun gear 26 and the ring gear 28. Input 122 may be provided from the power source 16 at the carrier 23. The pump 12 may be connected at the sun gear 26 and the variator unit 79 may be connected at the ring gear 28. Referring to FIG. 3, with the power source 16 on, a torque vector 124 is input to the carrier 23. Under a representative condition at the pump 12 without operative flow, such as when the road wheel 110 and 112 are not turning, velocity vectors 126 and 128 may result at the carrier 23 and ring gear 28, respectively. This may represent an ideal no-flow action of the pump 12. In applications, some flow may be supplied for orifices that bleed flow and for leakage make-up. The rotor of the pump 12 may not be operating to move the actuators 114, 115, and as a result there may be no velocity vector at the sun gear 26. A torque vector 130 may result at the ring gear 28 and a torque vector 132 may result at the sun gear 26. The magnitude of the sum of the vectors 130 and 132 may equal the magnitude of the vector 124. With reference to FIG. 4, in a full-flow condition fluid flow from the pump 12 may be represented by the indicator 134. A torque vector 135 may be input to the carrier 23. Velocity vectors 136 and 138 may result at the carrier 23 and ring gear 28, respectively. Additionally, a velocity vector 140 may result at the sun gear 26. A torque vector 142 may result at the ring gear 28 and a torque vector 144 may result at the sun gear 26. The magnitude of the sum of the vectors 142 and 144 may equal the magnitude of the vector 135. The torques 132 and 144 may be proportional to the input torques 124, 135, with the difference being the torques 130, 142 supplied to the variator unit 79.

Figure 5:
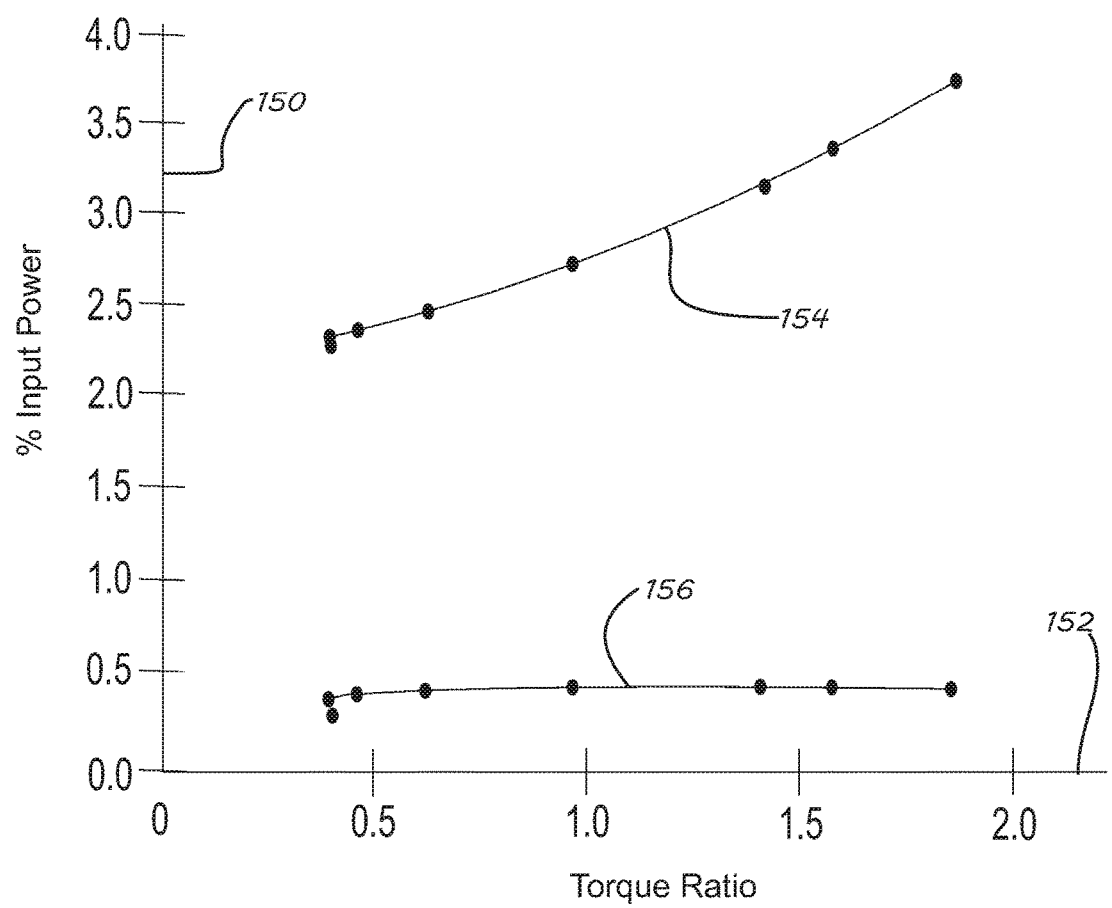
FIG. 5 is a graph illustrating percent input power versus torque ratio of a pump for a product according to a number of variations compared to a conventional pump.

With reference to FIG. 5, a graph of power consumption is shown with percent input power on the vertical axis 150 and torque ratio on the horizontal axis 152. Curve 154 shows power consumption for a conventional pump arrangement as a comparison, and curve 156 shows power consumption for a torque driven pump such as the pump 12. As shown by the curve 154, the conventional pump arrangement requires an increasingly greater percentage of input power as the torque ratio increases for high pressure flow conditions. Relative to curve 154, the unexpected and extremely low power consumption illustrated by curve 156 results from a flow rate of the pump 12 without wasted high pressure flow.

Referencing FIG. 1 an auxiliary pump 160 may be included which may draw fluid from the reservoir 118 through a conduit 117. The auxiliary pump 160 may be driven by an auxiliary drive unit 162 which may be a power takeoff unit drawing power from the power source 16, or may be a stand-alone unit such as an electric or fluid motor. The auxiliary pump 160 may supply pressure through a conduit 164 when the pump 12 may not generate the required pressure because pressure supplied by the pump 12 is proportional to torque from the power source 16. This may occur at very low torques (<20 Nm) from the power source 16. Below this torque level, the line pressure may be regulated to a minimum (for a CVT approximately 400 kPa). In a number of variations, functionality of the auxiliary pump 160 may include raising the line pressure in the conduit 116 by a constant offset. For example, the torque driven pump 12 may deliver a line pressure given as: pressure=torque×k, where k is a constant defined by the torque split ratio and the pump displacement. The desired line pressure may be given as: pressure=torque×(k+b), where b is a constant offset, which may be used factor in any torque spikes that may be encountered in operation. By feeding the output of the auxiliary pump 160 into the input of the pump 12, an offset pressure may be delivered to the torque driven pump 12, resulting a desired line pressure schedule in the conduit 116.

In a number of variations as illustrated in FIG. 1, a one way device 168 such as a check valve may be provided in conduit 117 to prevent flow from the auxiliary pump 160 from flowing directly to the reservoir 118. In addition, the auxiliary pump 160 may provide lubricant flow through a conduit 169 and a distribution system 171, which may be needed by components of the product 10 including the variator unit 79. The auxiliary pump 160 may be used to prime the pump 12 to recover from stops such as from a vehicle stop-start event where the power source is shut down when the associated vehicle comes to a standing stop.

Through the product 10, pumping losses may be minimized and efficiency increased by avoiding unnecessary high velocity pumping at high speeds of the power source 16. Line pressure supplied in the conduit 116 may automatically match the pressure requirements of the variator unit 79 as a result of inclusion of the torque splitting device 20. Responsiveness may be advantageous as a result of the auxiliary pump 160. The pump 12 and the accompanying torque splitting device 20 may be positioned at any of various locations along the power flow of the product 10. It is not necessary that the pump 12 be located in one specific point of the power flow. The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may involve a product that may include a power source, and a pump may be driven by the power source. A variable load may be driven by the power source and may be supplied with a fluid from the pump. A torque splitting device may have an input from the power source and may provide an output to each of the pump and the variable load.

Variation 2 may include a product according to variation 1 wherein the variable load may be a variator unit of a continuously variable transmission.

Variation 3 may include a product according to variation 1 or 2 wherein the pump has an inlet. An auxiliary pump may be connected with the inlet.

Variation 4 may include a product according to any of variations 1-3 wherein the torque splitting device provides the output to the pump at a first torque, and provides the output to the variable load at a second torque.

Variation 5 may include a product according to variation 4 and may include a torque converter connected between the power source and the torque splitting device. An output shaft may extend from the power source to the torque converter. A torque transfer element may extend from the torque splitting device and may be connected to drive the pump.

Variation 6 may include a product according to variation 4 and may include a multi-mode unit connected between the ring gear and the variable load. The multi-mode unit may have a clutch and a gear set with a first gear receiving input from the torque splitting device and a second gear meshing with the first gear and providing output to the variable load through the clutch.

Variation 7 may include a product according to variation 6 wherein the multi-mode unit may include a case. A second clutch may be engaged with the case. A third gear may mesh with the first gear and may be connectable with the case through the second clutch.

Variation 8 may include a product according to any of variations 1-7 wherein the variable load may comprise a primary pulley and a secondary pulley. A belt may extend around the primary and secondary pulleys. The power source may drive the primary pulley through the torque splitting device. An actuator may reside at each of the primary and secondary pulleys. The actuators may be supplied with the fluid from the pump through a conduit.

Variation 9 may include a product according to variation 8 and may include a gear set with a first gear meshing with a second gear. The gear set may be connected between the torque splitting device and the pump. The torque splitting device may include a third gear with a torque transfer element that extends from the first gear to the third gear connecting the first and third gears to rotate together. The pump may include a shaft extending to and connected to the second gear.

Variation 10 may include a product according to any of variations 1-9 and may include a pair of road wheels driven by the power source through the variable load and through a differential unit that may be connected with the road wheels.

Variation 11 may involve a product that may include a continuously variable transmission with a variator unit. A torque splitting device may be included wherein the variator unit may be connected to be driven through the torque splitting device. A pump may be connected to be driven through the torque splitting device. The pump may supply a fluid to the variator unit.

Variation 12 may include a product according to variation 11 wherein the variator may include a primary pulley and a secondary pulley. A belt may extend around the primary and secondary pulleys. The power source may drive the primary pulley through the torque splitting device. An actuator may be located at each of the primary and secondary pulleys. The actuators may be supplied with a fluid from a pump through a conduit.

Variation 13 may include a product according to variation 12 and may include a shaft extending from the secondary pulley. A differential unit may be connected to a pair of road wheels. The differential unit may be driven by the shaft.

Variation 14 may include a product according to any of variations 11-13 and may include a gear set that has a first gear meshing with a second gear. The gear set may be connected between the torque splitting device and the pump. A torque transfer element may extend from the first gear to the torque splitting device. The pump may include a shaft that may extend to, and may be connected to, the second gear.

Variation 15 may include a product according to any of variations 11-14 and may include a clutch. A multi-mode unit may be connected between the torque splitting device and the variator, and may provide a forward drive mode and a reverse mode.

Variation 16 may include a product according to variation 15 and may include a case and a second clutch. The second clutch may provide the reverse mode where the variator rotates in a first direction when the second clutch may be disengaged and rotates in a second direction opposite the first direction when the second clutch may be engaged.

Variation 17 may include a product according to any of variations 11-16 and may include a pair of road wheels driven by the variator through a number of gears.

Variation 18 may involve a product that may include an engine. A torque splitting device may be connected to be driven by the engine. A pump may be connected to and driven by the torque splitting device. A variator unit may be connected to and driven by the torque splitting device.

Variation 19 may include a product according to variation 18 wherein the pump has an inlet and further comprising an auxiliary pump having an outlet connected with the inlet to supply an offset pressure for torque spikes.

Variation 20 may include a product according to variation 19 and may include an auxiliary pump. At least one of the pumps may provide a fluid supply to the variator.

The above description of select variations within the scope of the invention is merely illustrative in nature and, thus, variations or variants thereof are not to be regarded as a departure from the spirit and scope of the invention.

What is claimed is:

1. A product comprising a power source, a pump driven by the power source, a variable load driven by the power source and supplied with a fluid from the pump, and a torque splitting device with an input from the power source and an output to each of the pump and the variable load, wherein the pump has an inlet and further comprising an auxiliary pump connected with the inlet.

2. The product according to claim 1 wherein the variable load is a variator unit of a continuously variable transmission.

3. The product according to claim 1 wherein the torque splitting device provides the output to the pump at a first torque, and provides the output to the variable load at a second torque.

4. The product according to claim 3 further comprising a torque converter connected between the power source and the torque splitting device, with an output shaft extending from the power source to the torque converter and a torque transfer element extending from the torque splitting device and connected to drive the pump.

5. The product according to claim 3 further comprising a multi-mode unit connected between the torque splitting device and the variable load, the multi-mode unit has a clutch and a gear set with a first gear receiving input from the torque splitting device and a second gear meshing with the first gear and providing output to the variable load through the clutch.

6. The product according to claim 5 wherein the multi-mode unit further comprises a case, a second clutch engaged with the case, and a third gear that meshes with the first gear and that is connectable with the case through the second clutch.

7. The product according to claim 1 wherein the variable load comprises a primary pulley and a secondary pulley with a belt extending around the primary and secondary pulleys, and the power source drives the primary pulley through the torque splitting device and further comprising an actuator at each of the primary and secondary pulleys, the actuators supplied with the fluid from the pump through a conduit.

8. The product according to claim 7 further comprising a gear set with a first gear meshing with a second gear, the gear set connected between the torque splitting device and the pump wherein the torque splitting device includes a third gear with a torque transfer element that extends from the first gear to the third gear connecting the first and third gears to rotate together, and wherein the pump includes a shaft extending to and connected to the second gear.

9. The product according to claim 1 further comprising a pair of road wheels driven by the power source through the variable load and through a differential unit connected with the road wheels.

10. A product comprising a continuously variable transmission with a variator unit, a torque splitting device, the variator unit connected to be driven through the torque splitting device, a pump, connected to be driven through the torque splitting device, and a clutch, and a multi-mode unit connected between the torque splitting device and the variator, providing a forward drive mode and a reverse mode, wherein the pump supplies a fluid to the variator unit.

11. The product according to claim 10 wherein the variator unit comprises a primary pulley and a secondary pulley with a belt extending around the primary and secondary pulleys, and comprising a power source that drives the primary pulley through the torque splitting device and further comprising an actuator at each of the primary and secondary pulleys, the actuators supplied with the fluid from the pump through a conduit.

12. The product according to claim 11 further comprising a shaft extending from the secondary pulley and a differential unit connected to a pair of road wheels, wherein the differential unit is driven by the shaft.

13. The product according to claim 10 further comprising a gear set that has a first gear meshing with a second gear, the gear set connected between the torque splitting device and the pump, wherein a torque transfer element extends from the first gear to the torque splitting device, and wherein the pump includes a shaft extending to and connected to the second gear.

14. The product according to claim 10 further comprising a case and a second clutch engaged with the case, the second clutch providing the reverse mode where the variator rotates in a first direction when the second clutch is disengaged and rotates in a second direction opposite the first direction when the second clutch is engaged.

15. The product according to claim 10 further comprising a pair of road wheels driven by the variator through a number of gears.

16. A product comprising an engine, a torque splitting device connected to be driven by the engine, a pump connected to and driven by the torque splitting device, and a variator unit connected to and driven by the torque splitting device, wherein the pump has an inlet and further comprising an auxiliary pump having an outlet connected with the inlet to supply an offset pressure for torque spikes.

17. The product according to claim 16 wherein at least one of the pumps provides a fluid supply to the variator.

* * * * *